(12) United States Patent
Schmitt et al.

(10) Patent No.: US 12,472,825 B2
(45) Date of Patent: Nov. 18, 2025

(54) CALIBRATION OF A USER INPUT APPARATUS AND DETECTION OF ACTUATION OF A USER INPUT APPARATUS OF A MOTOR VEHICLE

(71) Applicant: VALEO SCHALTER UND SENSOREN GMBH, Bietigheim-Bissingen (DE)

(72) Inventors: Martin Schmitt, Bad Rodach (DE); Raphael Sturm, Bad Rodach (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 18/695,113

(22) PCT Filed: Sep. 22, 2022

(86) PCT No.: PCT/EP2022/076322
§ 371 (c)(1),
(2) Date: Mar. 25, 2024

(87) PCT Pub. No.: WO2023/046816
PCT Pub. Date: Mar. 30, 2023

(65) Prior Publication Data
US 2024/0416755 A1    Dec. 19, 2024

(30) Foreign Application Priority Data
Sep. 24, 2021   (DE) .................... 10 2021 124 731.4

(51) Int. Cl.
*B60K 35/90*     (2024.01)
*G06F 3/041*     (2006.01)

(52) U.S. Cl.
CPC ............ *B60K 35/90* (2024.01); *G06F 3/0418* (2013.01); *B60K 2360/1438* (2024.01)

(58) Field of Classification Search
CPC ................ G06F 3/0418; G06F 3/0421; G06F 2203/04105; B60K 35/90; B60K 35/10;
(Continued)

(56) References Cited

U.S. PATENT DOCUMENTS

| | | | |
|---|---|---|---|
| 2009/0273584 A1* | 11/2009 | Staton | G06F 3/0445 345/178 |
| 2014/0168153 A1 | 6/2014 | Deichmann et al. | |

(Continued)

FOREIGN PATENT DOCUMENTS

| | | |
|---|---|---|
| DE | 102013225463 A1 | 6/2015 |
| DE | 102017008728 A1 | 3/2019 |

(Continued)

OTHER PUBLICATIONS

International Search Report Issued in corresponding PCT Application No. PCT/EP2022/076322, dated Jan. 4, 2023. (6 Pages with English Translation).

*Primary Examiner* — Yaron Cohen
(74) *Attorney, Agent, or Firm* — Osha Bergman Watanabe & Burton LLP

(57) ABSTRACT

A method for calibrating a user input apparatus for a motor vehicle is disclosed. The user input apparatus includes a component including a touch-sensitive surface and a reference element mechanically connected to the component, a circuit carrier, distance sensor, and an evaluation unit. The method includes determining, in a first calibration step, a first relationship between a change of the actuating force and a chance of the sensor signal, installing the user input apparatus in the motor vehicle in an installation step after carrying out the first calibration step, determining, in a second calibration step after carrying out the installation step, a first actual value of the sensor signal, and correcting the first relationship depending on the actual first value.

13 Claims, 3 Drawing Sheets

(58) Field of Classification Search
CPC ...... B60K 2360/143; B60K 2360/1438; B60K 2360/1434
See application file for complete search history.

(56) References Cited

U.S. PATENT DOCUMENTS

| | | |
|---|---|---|
| 2015/0338303 A1 | 11/2015 | Williams |
| 2017/0242505 A1 | 8/2017 | Vandermeijden et al. |
| 2017/0242539 A1* | 8/2017 | Mani ..................... G06F 3/0418 |

FOREIGN PATENT DOCUMENTS

| | | |
|---|---|---|
| DE | 102019204058 A1 | 10/2020 |
| DE | 102019113098 A1 | 11/2020 |
| FR | 3056860 A1 | 3/2018 |

* cited by examiner

CALIBRATION OF A USER INPUT APPARATUS AND DETECTION OF ACTUATION OF A USER INPUT APPARATUS OF A MOTOR VEHICLE

The present invention relates to a method for calibrating a user input apparatus for a motor vehicle, a method for detecting an actuation of a user input apparatus of a motor vehicle, and a user input apparatus for a motor vehicle, as well as a motor vehicle having such a user input apparatus.

Classic operating devices are partially being replaced by so-called smart surfaces in the vehicle interior of motor vehicles. Design, ambient lighting, and operating functionality are fused here. In particular, screens or other surfaces in the vehicle interior can be equipped with touch-sensitive surfaces which can detect a touch or a wiping gesture or the like of the user. One challenge which presents itself here is to distinguish between an intentional actuation of the user input apparatus by the user and an inadvertent touch of the touch-sensitive surface.

One possibility to remedy this is to detect the actuating force which the user exerts on the touch-sensitive surface using a correspondingly installed sensor and compare it to a threshold value. If the actuating force is sufficiently high, an intentional actuation can be presumed, otherwise an inadvertent touch.

Tolerances, material process variations in the production of the user input apparatus, and additional mechanical tensions or loads during the installation of the user input apparatus in the motor vehicle can have the result in the final installed product that the same actuating force results in different measured values of the sensor and therefore possibly in false positive or false negative detections of an actuation.

It is an object of the present invention to increase the reliability in detecting the actuation of a user input apparatus having a touch-sensitive surface.

This object is achieved by the subject matter of the independent claim. Advantageous refinements and preferred embodiments are the subject matter of the other independent claim and the dependent claims.

The invention is based on the concept of carrying out a two-step calibration of the user operating apparatus. In a first calibration step, a distance sensor is calibrated in that a relationship of the change of the actuating force with the change of the corresponding sensor signal is determined before the user operating apparatus is installed in the motor vehicle. After the installation in the motor vehicle, a second calibration step is carried out in which an actual value, in particular an absolute value, of the sensor signal is determined and the relationship determined in the first calibration step is corrected depending on the actual value determined after the installation, wherein the actual value in the second calibration step is in particular acquired while no actuating force is being exerted.

According to one aspect of the invention, a method for calibrating a user input apparatus for a motor vehicle is specified.

The user input apparatus has a component having a touch-sensitive surface and a reference element mechanically connected, in particular rigidly, to the component. The user input apparatus has a circuit carrier and a distance sensor, which is arranged on the circuit carrier and is configured to generate a sensor signal depending on a distance of the reference element from the distance sensor. The user input apparatus additionally has an evaluation unit, which is configured to detect an actuation of the user input apparatus, in particular only to detect it or to detect it precisely when the touch-sensitive surface is touched by a user and simultaneously an actuating force is exerted on the touch-sensitive surface which is greater than or equal to a specifiable minimal force.

The method according to the invention has a first calibration step, an installation step, which follows the first calibration step, thus is performed after the performance of the first calibration step, and a second calibration step, which follows the second installation step, thus is performed after the performance of the installation step. In the first calibration step before the installation, a first relationship is determined between a change of the actuating force and a change of the sensor signal, in particular the value or the absolute value, of the sensor signal. In the installation step after the performance of the first calibration step, the user input apparatus is installed in the motor vehicle, in particular is thus mechanically connected to the motor vehicle. In the second calibration step after performance of the installation step, a first actual value of the sensor signal is determined and the first relationship is corrected depending on the first actual value.

The evaluation unit is in particular electrically connected to the touch-sensitive surface, in order to be able to detect the touch of the touch-sensitive surface by the user. The touch-sensitive surface can be embodied, for example, as a so-called touchscreen or as a touch operating panel. The touch-sensitive surface can be designed here according to a known functional principle for implementing the touch sensitivity. For example, the touch-sensitive surface can be designed according to a resistive functional principle, a capacitive functional principle, or an inductive functional principle and so on. For detecting the touch of the touch-sensitive surface, thus in particular no or essentially no exertion of a force on the touch-sensitive surface is required.

The component having the touch-sensitive surface can be embodied, for example, as a screen or screen component, in particular as a screen for incorporation into a cockpit of the motor vehicle, for example, into a dashboard of the motor vehicle. In particular, the component is flexible, so that the distance between the component and the distance sensor and thus between the reference element and the distance sensor can change due to the exertion of the actuating force. For example, the component can be embodied as a plate, for example, consisting of or comprising one or more plastic materials. A plate can be understood here as a component, the extension of which in two spatial dimensions is significantly greater than in the third spatial dimension, for example, at least by a multiplication factor of 10, preferably at least 20, at least 50, or at least 100. In other words, the length and the width of the plate are significantly greater than the thickness of the plate. The plate can be essentially planar or curved, in particular in the force-free state, i.e., when no actuating force is exerted on the touch-sensitive surface.

From the viewpoint of the user, the circuit carrier is therefore arranged behind the component, in particular behind the screen, and is therefore not visible after the intended installation of the user input apparatus in the motor vehicle. This applies accordingly to the distance sensor and the reference element. If the user presses on the touch-sensitive surface to actuate the user input apparatus, he touches it and he generally exerts an actuating force at the same time. Depending on the dimension of the specifiable or specified minimal force, the evaluation unit can then detect or can only detect an actuation when the actuating force during the touching of the touch-sensitive surface is greater than or equal to a corresponding value. This can be carried out by comparing the sensor signal to an associated threshold value. The threshold value can in particular be derived from the corrected relationship.

The reference element can be understood in the meaning of a reference element in that it is used to measure the distance and is representative of the distance or the distance change between component and circuit carrier or distance sensor due to the actuating force. Due to the mechanical connection of the reference element to the component, an actuating force exerted on the touch-sensitive surface and thus the component is transmitted more or less directly to the reference element, so that the distance between the reference element and the distance sensor changes. The distance between the reference element and the distance sensor is therefore representative for a change of the position of the component or screen, for example, due to deflection or the like because of the actuating force.

The component, in particular the screen, can be produced, for example, by means of an injection molding method and, for example, can contain a plastic or consist thereof, for example, polycarbonate and/or polyurethane. After the injection molding process, a temperature treatment, in particular tempering, of the component can also be carried out.

The component and the reference element can be produced independently of one another and connected to one another after the production, for example, adhesively bonded, screwed, or clamped, and so on. For example, the reference element can be designed as a plunger and/or can be arranged on a side of the component facing away from the touch-sensitive surface and therefore on the side of the component facing toward the distance sensor. In alternative embodiments, the reference element can also be part of the component or can be integrally formed with the component. In particular, the reference element can correspond to an area of the component or the plate opposite to the distance sensor. In such embodiments, the distance between the reference element and the distance sensor directly corresponds to the distance of the component from the distance sensor.

The installation of the user input apparatus in the motor vehicle in particular includes the mechanical fastening of the user input apparatus, in particular the component having the touch-sensitive surface, to a part or a further component of the motor vehicle. In particular, the circuit carrier can also be mechanically connected to a part of the motor vehicle. For example, the connections can be produced by screw connections and/or clamp connections and/or rivet connections and so on.

Due to the production of the component, corresponding dimensional tolerances, curves, internal tensions, and so on, and also due to the mechanical connection of the component to other parts of the user input apparatus, in particular to the circuit carrier and so on, an actuation by a user with a specified force at a specified position can result in a different distance change depending on the user input apparatus, in particular a different deflection of the component or screen.

Due to the assembly of the user input apparatus with the motor vehicle, further deflections and/or tensions of the component and/or the circuit carrier can result, which result in further deviations in the deformation travel and accordingly in the measured distance or the measured distance change.

The corrected relationship can be viewed as a result of the method for calibration. The corrected relationship assigns a value for the actuating force to each value, in particular each observed actual value of the sensor signal. The evaluation unit can therefore compare the sensor signal directly to a threshold value, which corresponds to a specified minimal force according to the corrected relationship. The evaluation unit can therefore decide, based on the comparison of the sensor signal to the corresponding threshold value, whether an actuation is to be assumed since a sufficiently strong force is exerted, or not.

In other words, the calibration method according to the invention ensures that the threshold value to which the evaluation unit compares the actual value of the sensor signal in order to verify the actuation also actually corresponds to the specified minimal force. In other words, the corrected relationship supplies the correct threshold value for the specified minimal force.

The first calibration step can be carried out by means of the evaluation unit and/or by means of an external computing unit, which is connected to the evaluation unit. The second calibration step is preferably carried out by means of the evaluation unit. The second calibration step can in particular be carried out automatically by the evaluation unit, in particular without a corresponding interaction with the user being required for this purpose. The second calibration step can advantageously be repeated at different points in time, in order to take into consideration changing conditions in the course of the operation of the motor vehicle if necessary. Alternatively, the second calibration step can also be carried out depending on a corresponding user input.

The second calibration step is carried out in particular while no actuating force is exerted on the touch-sensitive surface. In other words, the actuating force which is exerted on the touch-sensitive surface during the determination of the first actual value in the second calibration step is equal to 0 N. This facilitates the automating capability and the automatic repetition of the second calibration step.

The reliability in detecting the actuation of the user input device by the user can thus be increased by the method according to the invention, in that the individual part-dependent variations, stresses, or pre-tensions which occur during the production of the component, the production of the user input apparatus, and the installation of the user input apparatus in the motor vehicle are taken into consideration and compensated for by the combination of the two calibration steps.

In order to determine the first relationship in the first calibration step, different actuating forces or changes of the actuating force can be exerted on the touch-sensitive surface and the associated change of the sensor signal can be measured. The relationship can thus be understood as a value relationship or curve for different changes of the actuating force and different changes of the sensor signal resulting therefrom.

The first relationship can approximately be a linear relationship. If one assumes a linear first relationship, the determination of the first relationship can include, for example, the determination of a corresponding slope of the first relationship or can consist thereof.

The distance sensor can be designed, for example, as an optical distance sensor, in particular as an active optical sensor system.

In order to determine a distance or to generate a corresponding sensor signal, the distance sensor can emit light in the direction of the reference element by means of an emitter unit of the distance sensor and can acquire portions of the light reflected by the reference element by means of a detector unit of the distance sensor. The detector unit contains one or more optical detectors, for example photodiodes. The emitter unit contains one or more light sources, for example light-emitting diodes or laser diodes. The light can correspond to infrared light, for example. The sensor signal can be generated, for example, depending on an intensity of the acquired reflected portions. For example, the sensor signal can be proportional to the acquired intensity of the reflected portions.

The smaller the distance is between reference element and distance sensor, the greater in general is the intensity of the reflected portions of the light, so that the distance can be concluded via the intensity. In further embodiments, the evaluation unit can also carry out a light time-of-flight measurement or a phase comparison measurement between emitted and reflected portions of the light based on the acquired portions of the light. The sensor signal which represents the distance can be generated based thereon.

According to at least one embodiment of the method according to the invention for calibrating a user input apparatus, the first actual value of the sensor signal is determined while no actuating force is exerted on the touch-sensitive surface.

According to at least one embodiment, in the first calibration step, a first actuating force having a nonzero first force value is exerted on the touch-sensitive surface and a first value of the sensor signal is determined during the exertion of the first actuating force. In each of a large number of iterations, thus in particular in three or more iterations, a second actuating force having a nonzero second force value is exerted on the touch-sensitive surface and in each case a second value of the sensor signal is determined during the exertion of the second actuating force. For each of the large number of iterations, the change of the sensor signal is determined as the difference between the first value of the sensor signal and the respective second value of the sensor signal in order to determine the relationship in the first calibration step.

According to at least one embodiment, to determine the first actual value of the sensor signal, light is emitted in the direction of the reference element by means of the emitter unit of the distance sensor and portions of the light reflected by the reference element are acquired by means of the detector unit of the distance sensor.

According to at least one embodiment, to correct the first relationship, a correction factor is determined depending on the first actual value of the sensor signal and the first relationship is multiplied by the correction factor.

In order to multiply the first relationship by the correction factor, in particular for each change of the actuating force, the corresponding determined value of the change of the actuating force is multiplied by the correction factor.

In other words, the first relationship can be expressed as $DS=DS(DF)=f(DF)$, wherein DS designates the change of the sensor signal and DF designates the change of the actuating force. f is a function which specifies the first relationship. If the first relationship is, for example, approximately linear, thus $f(DF)=m*DF+f(0)$.

The corrected first relationship is then given, for example, by $DS(DF)=g(DF)$, wherein $g=K*f$ and K designates the correction factor. In the linear case, thus $g(DF)=K*m*DF+K*f(0)$.

In various embodiments, the first relationship is a linear relationship, so that the corrected first relationship is also a linear relationship, wherein a slope of the corrected first relationship corresponds to a slope of the first relationship multiplied by the correction factor.

The correction factor can be determined, for example, based on a specified further relationship which assigns the first actual value to the correction factor.

The further relationship can be stored, for example, in a conversion table, also referred to as a lookup table (LUT), in a storage unit of the user input apparatus, in particular the evaluation unit. The further relationship can be experimentally determined beforehand here and saved accordingly.

According to at least one embodiment, the first relationship is determined at a first temperature value of an ambient temperature of the user input apparatus. In other words, the ambient temperature is set or regulated accordingly to the first temperature value to determine the first relationship. Also in the first calibration step, thus in particular after or before the determination of the first relationship, a second relationship is determined between the change of the actuating force and the change of the sensor signal at a second temperature value of the ambient temperature. In other words, the ambient temperature is set or regulated accordingly to the second temperature value to determine the second relationship. The first actual value is determined in the second calibration step at the first temperature value of the ambient temperature. In the second calibration step, in addition a second actual value of the sensor signal is determined at the second temperature value of the ambient temperature and the second relationship is corrected depending on the second actual value.

The determination of the first temperature value and the correction of the first relationship can take place independently in time of the determination of the second actual value and the correction of the second relationship. For example, during the second calibration step, the ambient temperature can be measured, for example, by means of a temperature sensor of the motor vehicle or the user input apparatus which is connected to the evaluation unit of the user input apparatus. If the measured ambient temperature is equal to the first temperature value or is in a specified tolerance range around the first temperature value, the first relationship can be corrected depending on the first actual value. If the measured ambient temperature is equal to the second temperature value or is in a specified tolerance range around the second temperature value, the second relationship can be corrected depending on the second actual value.

The statements with respect to the first actual value or the first relationship may be transferred analogously to the second actual value or the second relationship.

The method is not restricted to the determination of the first and the second relationship at the first and the second temperature value. In particular, corresponding relationships can be determined between the change of the actuating force and the change of the sensor signal at a large number of temperature values of the ambient temperature including the first temperature value and the second temperature value. In other words, a characteristic curve map or a characteristic map of the change of the sensor signal may be determined as a function of the change of the actuating force and the ambient temperature. Depending on which ambient temperature presently exists in the second calibration step, a corresponding correction of the respective relationship can be carried out. The reliability can thus also be increased further at various ambient temperatures.

According to at least one embodiment, in particular by means of the evaluation unit, a threshold value is determined, which corresponds to a change of the actuating force according to the corrected first relationship, the value of which is equal to a specified value for the minimal force and the threshold value is stored on a storage unit of the user input apparatus, in particular the evaluation unit.

In corresponding embodiments, an associated threshold value can be determined for the first and the second temperature or for all temperatures for which a corresponding relationship was determined. In other words, a threshold value dependent on the ambient temperature is thus determined, which is equal to the specified value for the minimal force for the respective temperature, in particular ambient temperature.

The threshold value can then be used by the evaluation unit to recognize whether an actuation of the user input apparatus by a user is present or not.

According to a further aspect of the invention, a method for detecting an actuation of a user input apparatus of a motor vehicle is specified.

The user input apparatus has a component having a touch-sensitive surface and a reference element mechanically connected to the component. The user input apparatus has a circuit carrier and a distance sensor, which is arranged on the circuit carrier and is configured to generate a sensor signal depending on a distance of the reference element from the distance sensor. The user input apparatus has an evaluation unit, which is configured to detect a touch of the touch-sensitive surface by a user and to receive the sensor signal from the distance sensor.

To carry out a method according to the invention for detecting an actuation of a user input apparatus, a method according to the invention for calibrating the user input apparatus is carried out, in particular in an embodiment in which the threshold value is determined, which corresponds to the change of the actuating force according to the corrected first relationship, the value of which is equal to the specified value for the minimal force, and the threshold value is stored on the storage unit of the user input apparatus. After the correction of the first relationship, a further actual value for the sensor signal is determined, in particular by means of the evaluation unit. A difference between the first actual value and the further actual value is compared by means of the evaluation unit to the stored threshold value and the actuation of the user input apparatus is only detected by means of the evaluation unit if the difference between the first actual value and the further actual value is greater than the threshold value, in particular only if the difference is greater than the threshold value and the touch of the touch-sensitive surface was detected.

In corresponding embodiments, the ambient temperature can be measured and the corresponding threshold value can be used, which corresponds to the measured ambient temperature according to the characteristic map dependent on the ambient temperature.

According to at least one embodiment of the method according to the invention for detecting an actuation of the user input apparatus, the touch of the touch-sensitive surface is detected by means of the evaluation unit and the actuation of the user input apparatus is only detected by means of the evaluation unit, in particular is detected precisely if the difference between the first actual value and the further actual value is greater than the threshold value while the touch of the touch-sensitive surface is detected.

According to a further aspect of the invention, a user input apparatus for a motor vehicle is specified. The user input apparatus has a component having a touch-sensitive surface and a reference element mechanically connected to the component, a circuit carrier, and a distance sensor, which is arranged on the circuit carrier and is configured to generate a sensor signal depending on a distance of the reference element from the distance sensor. The user input apparatus has a storage unit, which stores a first relationship between a change of an actuating force exerted on the touch-sensitive surface and a change of the sensor signal. The user input apparatus has an evaluation unit, which is configured to detect a touch of the touch-sensitive surface by a user, to receive the sensor signal from the distance sensor, to determine a first actual value of the sensor signal, and to correct the first relationship depending on the first actual value.

The user input apparatus is in particular configured to correct the first relationship when the user input apparatus is installed in the motor vehicle.

According to at least one embodiment of the user input apparatus according to the invention, the evaluation unit is configured to determine a threshold value which corresponds to a change of the actuating force according to the corrected first relationship, the value of which is equal to a specified value for the minimal force, and to store the threshold value on the storage unit.

According to at least one embodiment, the evaluation unit is configured to determine a further actual value for the sensor signal after the correction of the first relationship, to compare a difference between the first actual value and the further actual value to the stored threshold value, and to detect an actuation of the user input apparatus by means of the evaluation unit only if the difference between the first actual value and the further actual value is greater than the threshold value.

In particular, the evaluation unit is configured to detect the actuation of the user input apparatus only if the difference between the first actual value and the further actual value is greater than the threshold value while the touch of the touch-sensitive surface is detected.

According to a further aspect of the invention, a motor vehicle having a user input apparatus according to the invention is also specified.

Further embodiments of the user input apparatus follow directly from the various embodiments of the method according to the invention for calibrating a user input apparatus and of the method according to the invention for detecting an actuation of the user input apparatus and vice versa.

If reference is made within the scope of the present disclosure to a component of the user input apparatus, in particular the evaluation unit of the user input apparatus, or the external computing unit, being configured, embodied, designed, or the like to carry out or implement a specific function, to obtain a specific effect or to serve a specific purpose, then this can be understood to the effect that the component is specifically and actually able to carry out or implement the function, to obtain the effect or to serve the purpose, beyond the fundamental or theoretical usability or suitability of the component for this function, effect or purpose, by way of an appropriate adaptation, appropriate programming, an appropriate physical design and so on.

By definition, an active optical sensor system, in particular the emitter unit, has a light source for emitting light or light pulses. The light source can in particular be designed as a laser, for example as an infrared laser. Furthermore, by definition, an active optical sensor system, in particular the detector unit, has at least one optical detector to acquire reflected portions of the emitted light. The active optical sensor system is configured in particular to generate the sensor signal and possibly one or more further sensor signals based on the detected portions of the light and to process or output them.

The term "light" can be understood as comprising electromagnetic waves in the visible range, in the infrared range, and/or in the ultraviolet range. Accordingly, the term "optical" may also be understood as relating to light in this sense.

The evaluation unit can also be understood as a computing unit. In particular, a computing unit can be understood to mean a data processing device, i.e., the computing unit can in particular process data for the purpose of performing computing operations. Optionally, these also include operations for performing indicated accesses to a data structure, for example a lookup table (LUT).

The computing unit can in particular contain one or more computers, one or more microcontrollers, and/or one or more integrated circuits, for example, one or more application-specific integrated circuits (ASIC), one or more field-programmable gate arrays (FPGA), and/or one or more single-chip systems, SoC ("system on a chip"). The computing unit can also contain one or more processors, for example, one or more microprocessors, one or more central processor units (CPU), one or more graphics processing units (GPU), and/or one or more signal processors, in particular one or more digital signal processors (DSP). The computing unit may also contain a physical or virtual group of computers or other types of the mentioned units.

The computing unit of various exemplary embodiments contains one or more hardware and/or software interfaces and/or one or more storage units.

A storage unit can be embodied as a volatile data memory, for example, as a dynamic random access memory (DRAM) or a static random access memory (SRAM), or as a non-volatile data memory, for example as a read-only memory (ROM), as a programmable read-only memory (PROM), as an erasable read-only memory (EPROM), as an electrically erasable read-only memory (EEPROM), as a flash memory or flash EEPROM, as a ferroelectric random access memory (FRAM), as a magnetoresistive random access memory (MRAM), or as a phase-change random access memory (PCRAM).

Further features of the invention can be found in the claims, the figures, and the description of the figures. The features and combinations of features mentioned above in the description and the features and combinations of features mentioned below in the description of the figures and/or shown in the figures can be included in the invention not only in the combination specified in each case, but also in other combinations. In particular, embodiments and combinations of features that do not have all the features of an originally worded claim are also included in the invention. Furthermore, embodiments and combinations of features that go beyond or differ from the combinations of features set out in the back-references of the claims are included in the invention.

IN THE FIGURES

Figure 6:
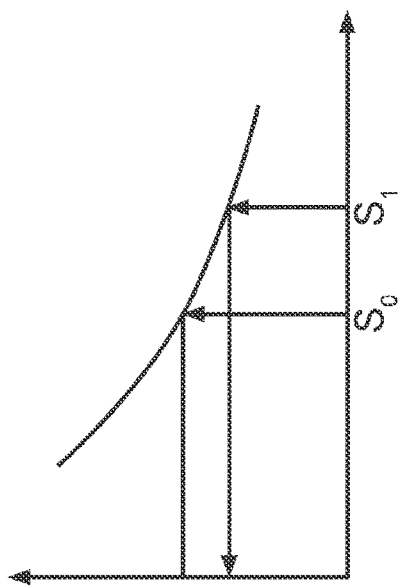
Figure 8:
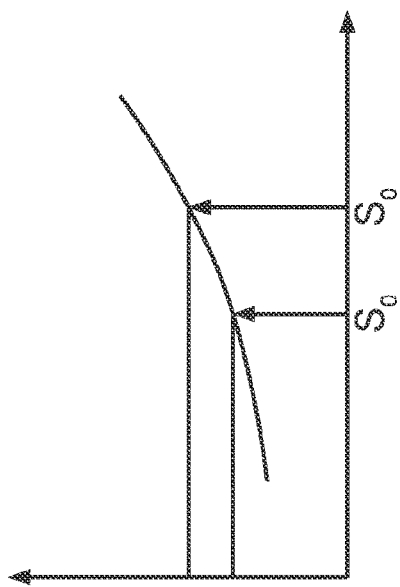
Figure 5:
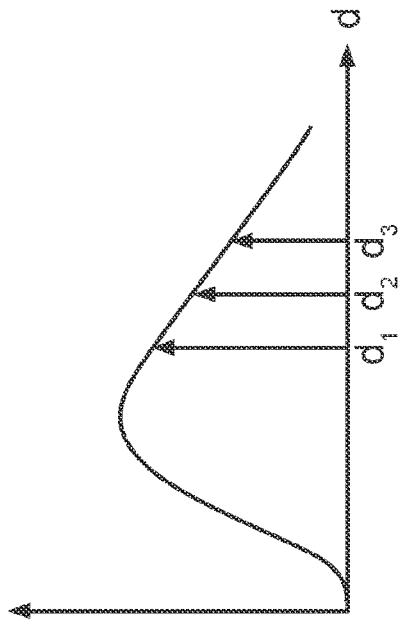
Figure 7:
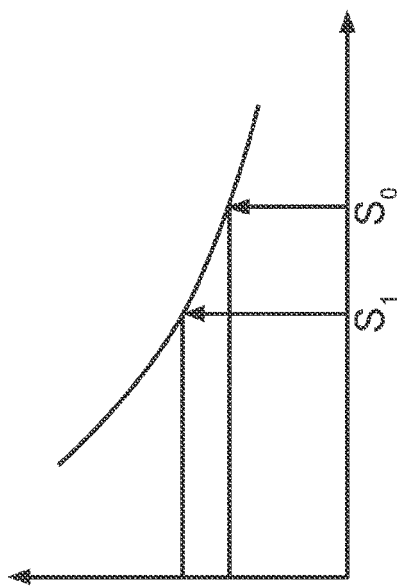

FIG. 5 schematically shows an exemplary relationship between a sensor signal of a distance sensor and a distance of a reference element from the distance sensor;

FIG. 6 schematically shows an exemplary course of a correction factor;

FIG. 7 schematically shows a further exemplary course of a correction factor; and FIG. 8 schematically shows a further exemplary course of a correction factor.

Figure 1:
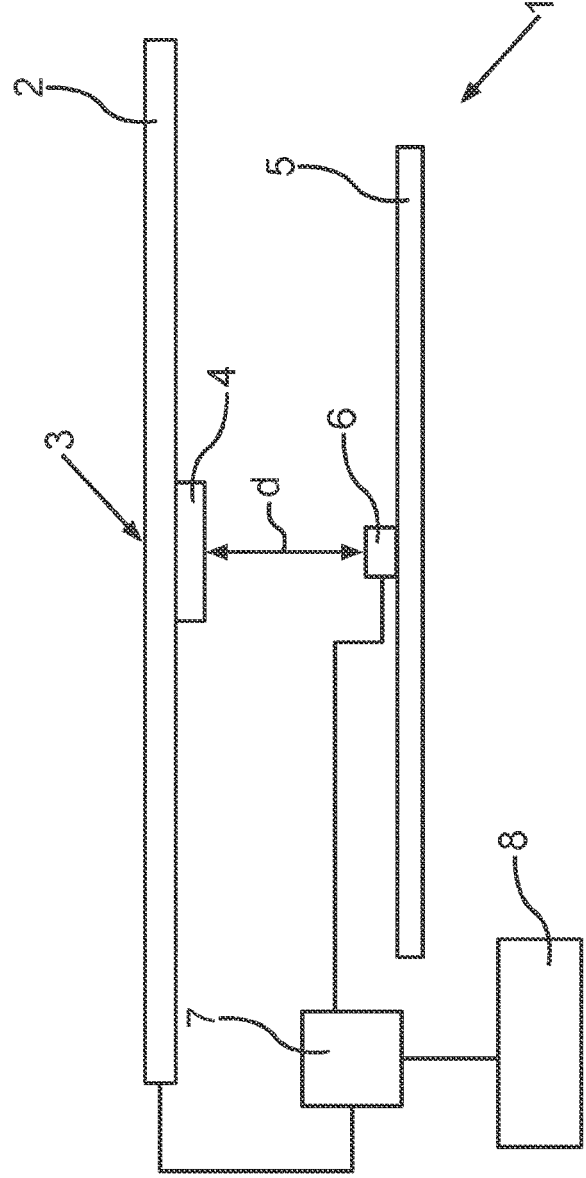
FIG. 1 shows a schematic illustration of an exemplary embodiment of a user input apparatus according to the invention.

FIG. 1 schematically shows an exemplary embodiment of a user input apparatus 1 according to the invention for a motor vehicle (not shown). The user input apparatus 1 has a component 2, in particular a screen, which has a touch-sensitive surface 3, which faces toward a user of the motor vehicle in the vehicle interior, in particular in a driver cab of the motor vehicle, when the user input apparatus 1 is installed as intended in the motor vehicle, so that the user can touch the touch-sensitive surface 3.

The user input apparatus 1 additionally has, in particular on a side of the component 2 facing away from the user, a circuit carrier 5, on which a distance sensor 6 is arranged, which is embodied, for example, as an active optical sensor system. The user input apparatus 1 also has a reference element 4, which is part of the component 2 or is connected in a mechanically rigid manner to the component 2, on the side of the component 2 facing toward the distance sensor 6. The distance sensor 6 can accordingly generate a sensor signal which corresponds to a distance d between the distance sensor 6 and the reference element 4.

An exemplary course of the sensor signal as a function of the distance d is schematically shown in FIG. 5. Furthermore, three values $d_1$, $d_2$, $d_3$ are plotted in FIG. 5 which are in a linear range of the sensor signal. The distance sensor 6 is, for example, preset or pilot controlled, for example, by setting a corresponding reverse voltage of an optical detector or the like, such that relevant distances d are in the linear range in order to ensure clarity of the measurement.

The user input apparatus 1 additionally has an evaluation unit 7, which is connected, on the one hand, to the touch-sensitive surface 3 and, on the other hand, to the distance sensor 6. The evaluation unit 7 can thus, on the one hand, detect a touch of the touch-sensitive surface 3 by a user and, on the other hand, receive the sensor signal from the distance sensor 6.

To carry out a method according to the invention for calibrating the user input apparatus 1, an external computing unit 8 can optionally be provided, which is connected to the evaluation unit 7. Alternatively, the evaluation unit 7 can assume the function of the external computing unit 8.

To carry out the method according to the invention for calibration, initially a first calibration step is carried out before the installation of the user input apparatus 1 in the motor vehicle. A relationship is determined here between the change of the actuating force and the change of the sensor signal. The user input apparatus 1 is then installed in the motor vehicle in an installation step. A second calibration step is then carried out in order to correct the relationship determined in the first calibration step and thus be able to compensate for deflections or pre-tensions of the component 2 which occur or change upon the installation in the motor vehicle. For this purpose, an actual value of the sensor signal is determined in the second calibration step, while no actuating force is exerted on the component 2, and the relationship is corrected depending on the actual value.

For example, a conversion table, which assigns a correction factor to the actual value, can be stored on a storage unit (not shown) of the user input apparatus 1, in particular the evaluation unit 7. The relationship between change of the actuating force and change of the sensor signal from the first calibration step can then be multiplied by the correction factor in order to calibrate the relationship. For this purpose, in particular the slope of the relationship can be multiplied by the correction factor if the relationship is a linear or approximately linear relationship.

The evaluation unit 7 can then determine a threshold value depending on the corrected relationship which corresponds to a specified minimal force that is assigned to the actuation by a user. In other words, a minimal force is specified, wherein an actuation of the user input apparatus 1 by a user is only to be detected if, on the one hand, the touch-sensitive surface 3 is touched and, on the other hand, at least one actuating force at the level of the specified minimal force is exerted on the component 2, which results in a corresponding change of the distance d and can in turn be detected by a change of the sensor signal. It is ensured by the determination of the threshold value on the basis of the corrected relationship that the threshold value which is used by the evaluation unit to verify the actuation is also actually the specified value for the minimal force. Component tolerances and deflections or pre-tensions in the production and installation of the user input apparatus 1 can thus be compensated for.

The first calibration step can be carried out by means of the external computing unit 8 or alternatively by means of the evaluation unit 7. The second calibration step is preferably carried out by means of the evaluation unit 7.

Figure 2:
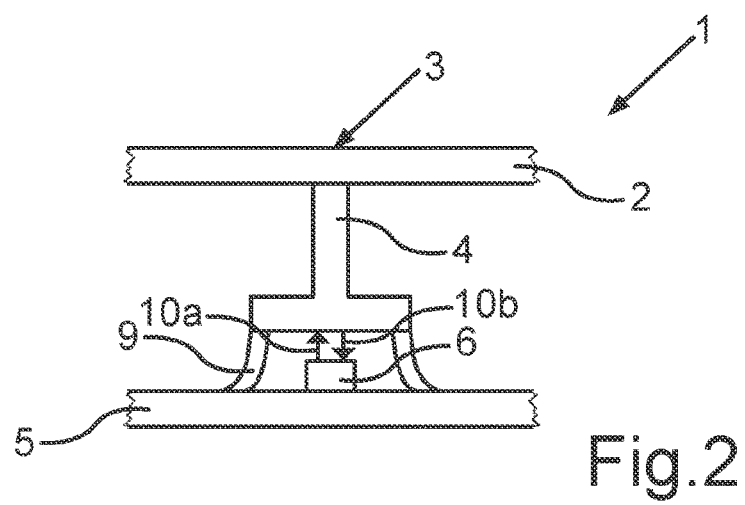
FIG. 2 shows a schematic illustration of a further exemplary embodiment of a user input apparatus according to the invention.

FIG. 2 schematically shows a further exemplary embodiment of the user input apparatus 1 according to the invention, wherein the evaluation unit 7 and the external computing unit 8 are not shown for the sake of clarity.

In the example of FIG. 2, the distance sensor 6 is embodied, for example, as an active optical sensor system which contains an emitter unit (not shown), for example, an infrared laser diode or an infrared LED, and a detector unit (not shown), for example, having one or more optical detectors, such as one or more photodiodes. The emitter unit emits light 10a in the direction of the reference element 4 and the detector unit detects reflected portions 10b of the light, which are reflected by the reference element 4. The sensor signal can then be generated, for example, proportionally to the detected intensity of the reflected portions 10b and thus represents the distance d.

As also shown in FIG. 2, the reference element 4 can be designed, for example, as a plunger or in a plunger shape and is connected to the component 2. The plunger can be connected here on a side facing toward the distance sensor 6, for example, by a rubber membrane 9 or a similar sealing element to the circuit carrier 5, so that the distance sensor 6 is completely enclosed by the rubber membrane 9 and the reference element 4 as well as the circuit carrier 5. Contamination of the area between the plunger and the distance sensor 6 can thus be prevented, which increases the reliability of the distance measurement in the long term. The rubber membrane 9 is made flexible here, so that the plunger can still move with respect to the distance sensor 6. The rubber membrane can advantageously also generate a restoring force which, when the user no longer exerts an actuating force on the component 2, returns the plunger to the neutral position.

Figure 3:
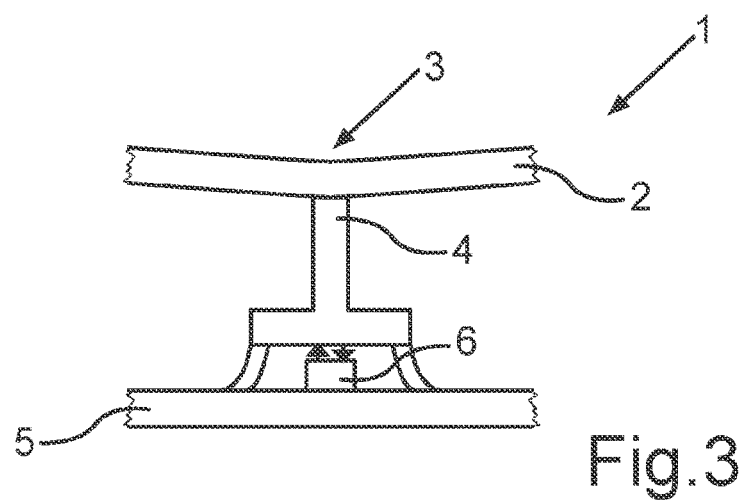
FIG. 3 shows a schematic illustration of a further exemplary embodiment of a user input apparatus according to the invention.
Figure 4:
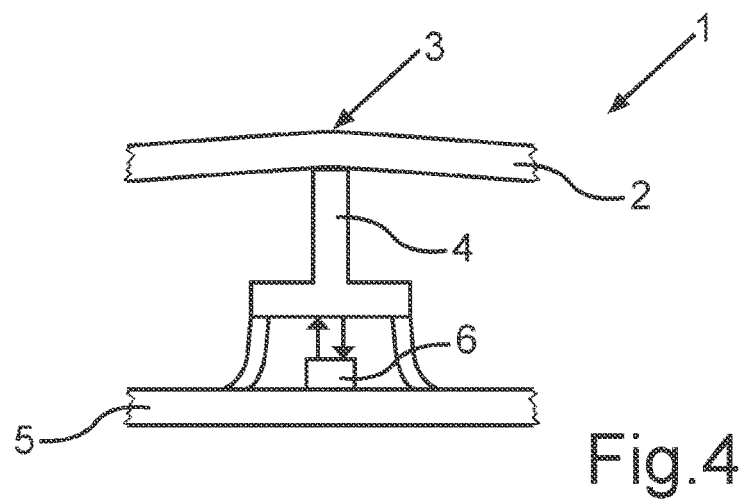
FIG. 4 shows a schematic illustration of a further exemplary embodiment of a user input apparatus according to the invention.

In FIG. 2, the component 2 is schematically shown as an essentially planar plate. In FIG. 3 and FIG. 4, the user input apparatus 1 of FIG. 2 is shown again, wherein different deformations of the component 2 are outlined. These different deformations, in particular a concave deformation in FIG. 3 and a convex deformation in FIG. 4, can be caused, for example, by the design of the component 2, by internal stresses in the component 2, or by stresses or deformations due to the installation of the user input apparatus 1 in the motor vehicle.

Depending on how the component 2 is subjected to corresponding pre-tensions or forces, a given actuating force can result in a greater or lesser distance change and accordingly in a different change of the sensor signal. This is taken into consideration by the two-step calibration according to the method according to the invention, so that the correct threshold value for the sensor signal is always available.

FIG. 6 to FIG. 8 show schematic exemplary courses of the correction factor as a function of the actual value of the sensor signal. In the example of FIG. 6, for example, a concave pre-tension of the screen is provided, as is outlined in FIG. 3.

The sensor signal is plotted on the horizontal axis, the correction factor on the vertical axis. The value $S_0$ corresponds to a value of the sensor signal before the installation of the user input apparatus 1 in the motor vehicle. The correction factor at $S_0$ is accordingly equal to 1. The value $S_1$ corresponds to the actual value of the sensor signal measured in the second calibration step. In the example of FIG. 6, this is greater than $S_0$ and the associated correction factor is less than 1.

Accordingly, a course of the correction factor for a convex component 2, as is outlined in FIG. 4, is schematically shown in FIG. 7. The value $S_1$ is, for example, less than the value $S_0$ here and the correction factor is accordingly greater than 1.

It is to be emphasized that the course of the correction factor as a function of the sensor signal or the actual value of the sensor signal depends on the specific conditions of the individual case and therefore cannot necessarily be universally specified, but rather can be determined by experiments. In particular, the course is not necessarily decreasing as outlined in FIG. 6 and FIG. 7. A further course of the correction factor as a function of the actual value of the sensor signal is schematically shown in FIG. 8, which also corresponds to a concave screen as outlined in FIG. 3. The value $S_1$, as also shown for FIG. 6, is greater than the value $S_0$ here, but the correction factor is greater than 1 in this specific situation.

As described in particular with reference to the figures, the invention enables the reliability of detecting the actuation of a user input apparatus having a touch-sensitive surface to be increased.

In so-called smart user interfaces, the screen used as the interface can be curved by different amounts. This is due, for example, to the injection molding process in the production of the screen, for example from polycarbonate and polyurethane, and corresponding post-tempering. Depending on the curvature, internal tensions, and interplay with other mechanical parts of the user input apparatus, a different deflection travel of the screen can be detected for an actuation with the same actuating force at the same point. Moreover, an additional deflection and/or tension of the screen occurs due to the screwing of the user input apparatus into the dashboard of the motor vehicle.

Depending on how strongly the screen is accordingly curved or warped, an actuation with a defined force at the same location, for example, a touch button or soft key, is expressed by a different deformation travel which can be measured.

In order to counter both the mechanical tolerances and the screen warping and also the possible corruption of the calibration by screwing in or installing the user input apparatus in the motor vehicle, for example, a software readjustment process can be implemented in embodiments of the invention. The change of the sensor signal is accordingly calibrated before the installation of the user input apparatus. The distance present after the installation between the distance sensor and a corresponding reference point, which depends on the actual screen curvature and screen pretension, can be measured as the actual value of the sensor signal. Depending on the absolute value of the sensor signal, the calibrated relationship can be corrected, for example, via a lookup table. The lookup table and the correction factors contained therein can be determined, for example, experimentally on real parts.

The invention claimed is:

1. A method for calibrating a user input apparatus for a motor vehicle, wherein the user input apparatus comprises: a component comprising a touch-sensitive surface and a reference element mechanically connected to the component; a circuit carrier and a distance sensor, wherein the distance sensor is arranged on the circuit carrier and is configured to generate a sensor signal depending on a distance of the reference element from the distance sensor; and an evaluation unit, which is configured to detect an actuation of the user input apparatus when the touch-sensitive surface is touched by a user and simultaneously an actuating force is exerted on the touch-sensitive surface which is greater than or equal to a specifiable minimal force; the method comprising: determining, in a first calibration step, a first relationship between a change of the actuating force and a change of the sensor signal; installing the user input apparatus in the motor vehicle in an installation step after carrying out the first calibration step; determining, in a second calibration step after carrying out the installation step, a first actual value of the sensor signal; and correcting the first relationship depending on the first actual value, wherein, to determine the first actual value of the sensor signal, light is emitted in the direction of the reference element by an emitter unit of the distance sensor and portions of the light reflected by the reference element are acquired by a detector unit of the distance sensor.

2. The method for calibrating a user input apparatus as claimed in claim 1, wherein the first actual value of the sensor signal is determined while no actuating force is exerted on the touch-sensitive surface.

3. The method for calibrating a user input apparatus as claimed in claim 1 further comprising: exerting a first actuating force with a nonzero first force value on the touch-sensitive surface and determining a first value of the sensor signal during the exertion of the first actuating force; in each of a large number of iterations, exerting a second actuating force with a nonzero second force value on the touch-sensitive surface and determining a second value of the sensor signal during the exertion of the second actuating force; and for each of the large number of iterations, determining the change of the sensor signal as the difference between the first value and the second value of the sensor signal in order to determine the first relationship in the first calibration step, wherein a large number of iterations is three or more iterations.

4. The method for calibrating a user input apparatus as claimed in claim 1, wherein, to correct the first relationship, a correction factor is determined depending on the first actual value of the sensor signal and the first relationship is multiplied by the correction factor.

5. The method for calibrating a user input apparatus as claimed in claim 4, wherein the correction factor is determined based on a specified further relationship which assigns the correction factor to the first actual value.

6. The method for calibrating a user input apparatus as claimed in claim 1, further comprising: determining the first relationship at a first temperature value of an ambient temperature of the user input apparatus; in the first calibration step, determining a second relationship between the change of the actuating force and the change of the sensor signal at a second temperature value of the ambient temperature; determining the first actual value in the second calibration step at the first temperature value of the ambient temperature; and in the second calibration step, determining a second actual value of the sensor signal at the second temperature value of the ambient temperature and correcting the second relationship depending on the second actual value.

7. The method for calibrating a user input apparatus as claimed in claim 1, further comprising: determining a threshold value, which corresponds to a change of the actuating force according to the corrected first relationship, wherein the value of the threshold value is equal to the specifiable minimal force, and wherein the threshold value is stored on a storage unit of the user input apparatus.

8. A method for detecting an actuation of a user input apparatus of a motor vehicle, comprising: carrying out the method for calibrating a user input apparatus as claimed in claim 7, after the correction of the first relationship, determining a further actual value for the sensor signal; comparing a difference between the first actual value and the further actual value by means of the evaluation unit to the stored threshold value; and detecting the actuation of the user input apparatus by means of the evaluation unit only if the difference between the first actual value and the further actual value is greater than the threshold value.

9. The method for detecting an actuation of a user input apparatus as claimed in claim 8, further comprising: detecting a touch of the touch-sensitive surface by means of the evaluation unit; and detecting the actuation of the user input apparatus by means of the evaluation unit only if the difference between the first actual value and the further actual value is greater than the threshold value while the touch of the touch-sensitive surface is detected.

10. A user input apparatus for a motor vehicle, comprising:
a component comprising a touch-sensitive surface and a reference element mechanically connected to the component;
a circuit carrier and a distance sensor, which is arranged on the circuit carrier and is configured to generate a sensor signal depending on a distance of the reference element from the distance sensor;
a storage unit, which stores a first relationship between a change of an actuating force exerted on the touch-sensitive surface and a change of the sensor signal; and an evaluation unit, which is configured to detect a touch of the touch-sensitive surface by a user, to receive the sensor signal from the distance sensor, to determine a first actual value of the sensor signal, and to correct the first relationship depending on the first actual value, wherein, to determine the first actual value of the sensor signal, light is emitted in the direction of the reference element by means of an emitter unit of the distance sensor and portions of the light reflected by the reference element are acquired by means of a detector unit of the distance sensor.

11. The user input apparatus as claimed in claim 10, wherein the evaluation unit is configured to determine a threshold value which corresponds to a change of the actuating force according to the corrected first relationship, the value of which is equal to a specified value for the minimal force, and wherein the evaluation unit is configured to store the threshold value on the storage unit.

12. The user input apparatus as claimed in claim 11, wherein the evaluation unit is configured to:

determine a further actual value for the sensor signal after the correction of the first relationship;

compare a difference between the first actual value and the further actual value to the stored threshold value; and detect an actuation of the user input apparatus by means of the evaluation unit only if the difference between the first actual value and the further actual value is greater than the threshold value.

13. The user input apparatus as claimed in claim 12, wherein the evaluation unit is configured to detect the actuation of the user input apparatus only if the difference between the first actual value and the further actual value is greater than the threshold value while the touch of the touch-sensitive surface is detected.

* * * * *